United States Patent
Jeong et al.

(10) Patent No.: US 12,240,099 B2
(45) Date of Patent: Mar. 4, 2025

(54) ROBOT HAVING A PLURALITY OF LEGS AND METHOD FOR DETERMINING TOUCHDOWN POSITION THEREOF

(71) Applicant: Rainbow Robotics, Daejeon (KR)

(72) Inventors: Hyo Bin Jeong, Daejeon (KR); Tae Won Kim, Daejeon (KR); Jun Ho Oh, Seoul (KR)

(73) Assignee: Rainbow Robotics, Daejeon (KR)

( * ) Notice: Subject to any disclaimer, the term of this patent is extended or adjusted under 35 U.S.C. 154(b) by 210 days.

(21) Appl. No.: 18/060,399

(22) Filed: Nov. 30, 2022

(65) Prior Publication Data

US 2024/0157572 A1 May 16, 2024

(30) Foreign Application Priority Data

Nov. 14, 2022 (KR) .......... 10-2022-0151738

(51) Int. Cl.
*B25J 13/08* (2006.01)
*B25J 9/16* (2006.01)
*B62D 57/032* (2006.01)

(52) U.S. Cl.
CPC .......... *B25J 13/084* (2013.01); *B25J 9/1664* (2013.01); *B25J 13/089* (2013.01); *B62D 57/032* (2013.01)

(58) Field of Classification Search
CPC ...... B25J 9/1664; B25J 9/1679; B25J 13/084; B25J 13/089; B60J 9/00; B62D 57/032
See application file for complete search history.

(56) References Cited

U.S. PATENT DOCUMENTS

| | | | |
|---|---|---|---|
| 9,499,218 B1 * | 11/2016 | Stephens | B25J 9/1651 |
| 2010/0161120 A1 * | 6/2010 | Goswami | B62D 57/032 901/1 |
| 2011/0301756 A1 * | 12/2011 | Yoshiike | B62D 57/032 901/1 |

(Continued)

FOREIGN PATENT DOCUMENTS

| | | |
|---|---|---|
| JP | 2006-175567 A | 7/2006 |
| KR | 10-2013-0063230 A | 6/2013 |

(Continued)

OTHER PUBLICATIONS

International Search Report for PCT/KR2023/013802 by Korean Intellectual Property Office dated Dec. 13, 2023.

*Primary Examiner* — Jason Holloway
*Assistant Examiner* — Blake A Wood
(74) *Attorney, Agent, or Firm* — BROADVIEW IP LAW, PC

(57) ABSTRACT

The present invention relates to a method for determining a touchdown position of a robot performed by a computing device, the method comprising the steps of: detecting a disturbance during swing of a first leg of the robot toward a first touchdown position, calculating a second touchdown position based on a dynamic state of the robot in response to the detection of the disturbance, identifying a step obstacle region based on terrain information of the robot and determining whether the second touchdown position belongs to the step obstacle region, and determining a third touchdown position out of the step obstacle region as the touchdown position of the first leg, in a case in which the second touchdown position belongs to the step obstacle region.

7 Claims, 19 Drawing Sheets

(56) References Cited

U.S. PATENT DOCUMENTS

| | | | | |
|---|---|---|---|---|
| 2012/0245734 A1* | 9/2012 | Yun | .................... | B62D 57/032 |
| | | | | 901/1 |
| 2015/0073592 A1* | 3/2015 | Kaneko | ................ | B62D 57/024 |
| | | | | 901/29 |
| 2020/0016750 A1* | 1/2020 | Swilling | .............. | B62D 57/032 |
| 2020/0324412 A1* | 10/2020 | Whitman | ............... | B25J 9/1666 |

FOREIGN PATENT DOCUMENTS

| | | |
|---|---|---|
| KR | 10-2021-0152055 A | 12/2021 |
| WO | 2012/011182 A1 | 1/2012 |

* cited by examiner (a)  (b)

ROBOT HAVING A PLURALITY OF LEGS AND METHOD FOR DETERMINING TOUCHDOWN POSITION THEREOF

BACKGROUND OF THE INVENTION

Cross-Reference to Related Applications

This application claims priority under 35 U.S.C § 119 to Korean Patent Application No. 10-2022-0151738 filed in the Korean Intellectual Property Office on Nov. 14, 2022, the entire contents of which are hereby incorporated by reference.

Field of the Invention

The present invention relates to a robot having a plurality of legs and a method for determining a touchdown position thereof. More specifically, the present invention relates to a robot having a plurality of legs, which land at an appropriate position on the ground when the robot swings and moves its legs, and a method for determining a touchdown position thereof.

Background Art

A robot refers to a multifunctional manipulator designed to perform specific motions and tasks through programmed variable motions. Robots have been widely used in a variety of industries, including manufacturing, transportation, exploration, medical treatment, surveillance, patrol, and the like.

The robot may be physically fixed at a specific position like an industrial robot arm, but may be configured to be movable by including one or more legs or wheels. The movable robot is wider in utilization and application than the fixed robot.

As a representative example of the movable robot, there is a multi-legged robot. The multi-legged robot should not step on or hit obstacles if possible, and requires a walking control technology for avoiding a contact with obstacles and stably maintaining balance and speed of the robot.

SUMMARY OF THE INVENTION

Accordingly, the present invention has been made to solve the above-mentioned problems occurring in the prior arts, and it is an object of the present invention to provide a robot, which can walk and move while landing legs at an appropriate position on the ground in irregular geographical features, and a method for determining a touchdown position of the robot.

It is another object of the present invention to provide a robot, which can stably maintain its posture by landing the legs at an appropriate position even when a disturbance is applied during swinging of the legs, and a method for determining a touchdown position of the robot.

According to an embodiment of the present invention, a method for determining a touchdown position of a robot is performed by a computing device, the method comprising the steps of: detecting a disturbance during swing of a first leg of the robot toward a first touchdown position, calculating a second touchdown position based on a dynamic state of the robot in response to the detection of the disturbance, identifying a step obstacle region based on terrain information of the robot, and determining whether the second touchdown position belongs to the step obstacle region, and determining a third touchdown position out of the step obstacle region as the touchdown position of the first leg, in a case in which the second touchdown position belongs to the step obstacle region.

According to an embodiment of the present invention, a robot having a plurality of legs comprising: a processor, a memory loading a computer program executed by the processor, and a storage storing the computer program, wherein the computer program comprises instructions for executing: an operation of detecting a disturbance during swing of a first leg of the robot toward a first touchdown position, an operation of calculating a second touchdown position based on a dynamic state of the robot in response to the detection of the disturbance, an operation of identifying a step obstacle region based on terrain information of the robot, and determining whether the second touchdown position belongs to the step obstacle region, and an operation of determining a third touchdown position out of the step obstacle region as the touchdown position of the first leg, in a case in which the second touchdown position belongs to the step obstacle region.

According to embodiments of the present invention described above, provided are the robot which can walk and move while landing legs at an appropriate position on the ground in irregular geographical features, and the method for determining a touchdown position of the robot.

In addition, the robot can stably maintain its posture by landing the legs at an appropriate position even when a disturbance is applied during swinging of the legs.

DETAILED DESCRIPTION OF THE PREFERRED EMBODIMENT

Figure 1:
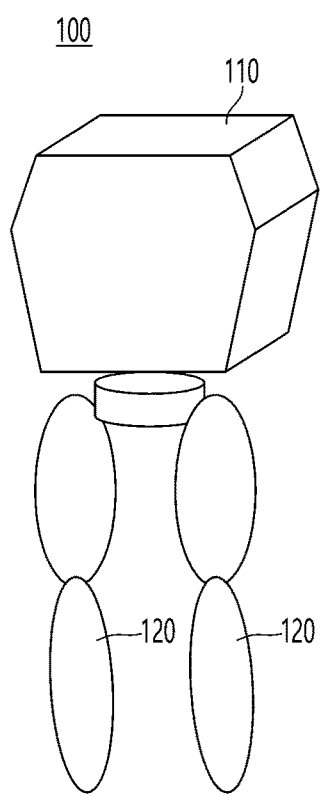
FIG. 1 is a schematic diagram illustrating a robot having a plurality of legs according to an embodiment of the present invention.
Figure 1:
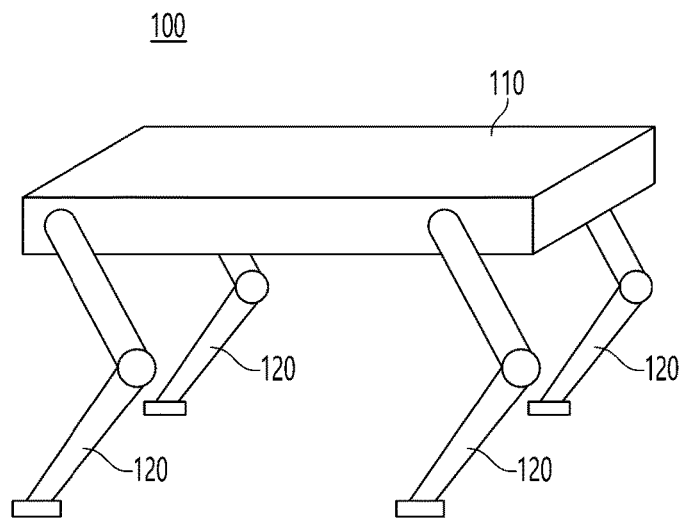

Hereinafter, an explanation of embodiments of the present invention will be given in detail with reference to the attached drawings. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms. Those skilled in the art will envision many other possible variations within the scope of the present invention.

In the description, the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification. Terms used in this application are used to only describe specific exemplary embodiments and are not intended to restrict the present invention. An expression referencing a singular value additionally refers to a corresponding expression of the plural number, unless explicitly limited otherwise by the context.

Terms, such as the first, the second, A, B, (a), and (b) may be used to describe various elements, but the elements should not be restricted by the terms. The terms are used to only distinguish one element from the other element. When it is said that one element is described as being "connected" or "coupled" to the other element, one element may be directly connected or coupled to the other element, but it should be understood that another element may be present between the two elements.

Hereinafter, some embodiments of the present invention will be described in detail with reference to the accompanying drawings.

FIG. 1 is a schematic diagram illustrating a robot having a plurality of legs according to an embodiment of the present invention. Referring to FIG. 1, the robot 100 is a robot capable of walking and moving, and may be a humanoid robot having two legs as illustrated in FIG. 1A or may be a horse-type robot having four legs as illustrated in FIG. 2B.

However, the scope of the present invention is not limited to the type of robot illustrated in FIG. 1. For example, the robot 100 may have three, five, or more legs, and may have various shapes other than the humanoid type or the horse type.

Referring to FIG. 1, the robot 100 includes a main body 110 and two or more legs 120. Each leg 120 may have an upper portion and a lower portion coupled to the body 110 and separated by a leg joint.

In an embodiment, the robot 100 may further include at least one appendage, such as an articulated arm, disposed on the body 110 to be movable relative to the body 110. One or more actuators for gripping/grasping objects may be disposed at a distal end of the articulated arm.

The robot 100 may include a vision system having an imaging sensor or camera, and each sensor or camera collects image data or sensor data about the environment and terrain around the robot 100. The vision system may pan or tilt the camera to move the visual field of the robot 100 in any direction. The image data or sensor data collected by the cameras or sensors of the vision system may be provided to a central processing unit.

The robot 100 walks by swinging the legs 120 along a pre-planned trajectory. A swing cycle of the leg 120 includes a lifting phase and a touchdown phase. The lifting phase refers to a section from lifting the leg that touched the ground to reaching the highest point of the swing trajectory, and the touchdown phase refers to a section from descending of the legs from the highest point of the swing trajectory to landing (or touchdown) on the ground.

The above will be further described with reference to FIG. 2.

Figure 2:
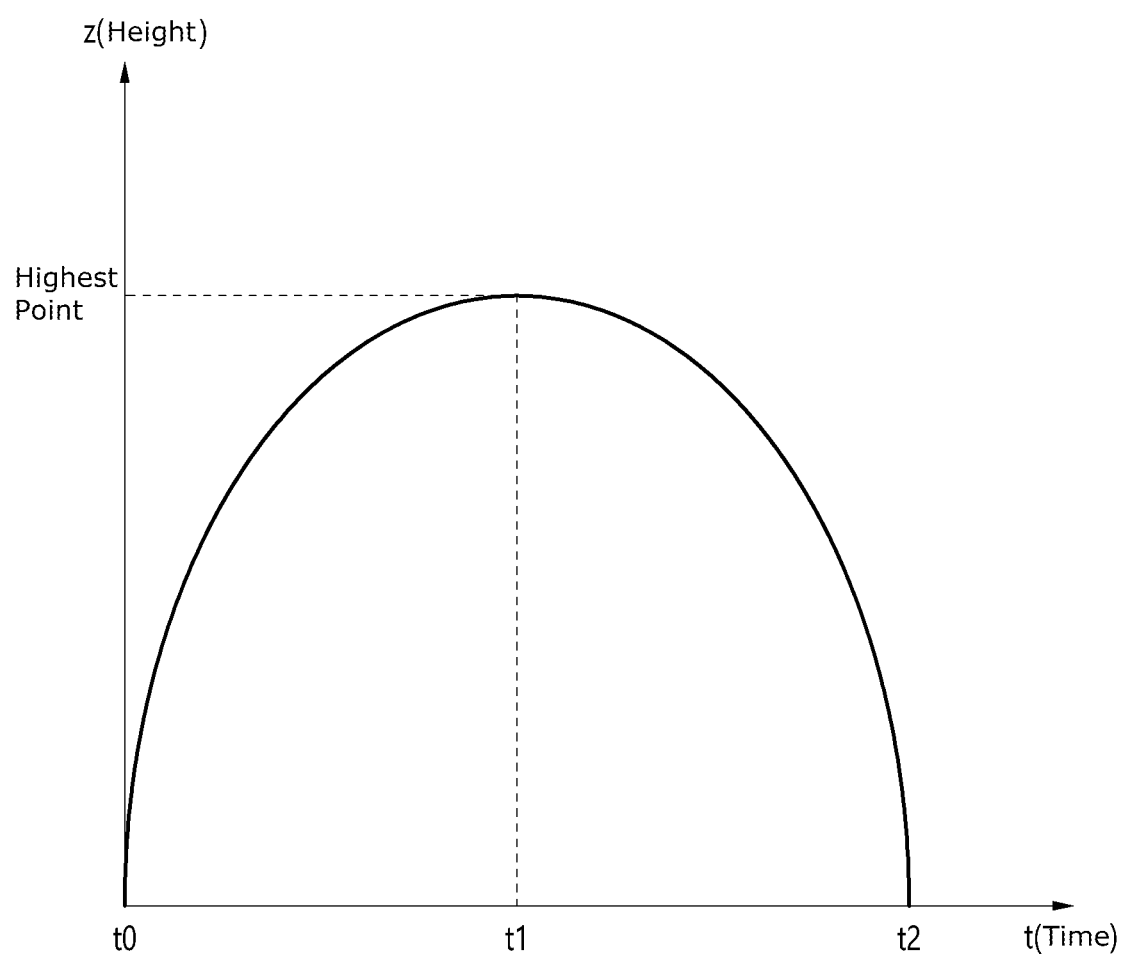
FIG. 2 is a diagram for depicting a swing cycle when the robot walks.

FIG. 2 illustrates the swing cycle of the leg when the robot walks. The swing cycle of the leg starts at time t0 in a state in which the leg lands on the ground, and ends at time t2 that the leg lands on the ground again after reaching the highest point t1 by swinging.

In this instance, the section from t0 to t1, which is the section until the leg reaches the highest point after being lifted from the ground, is in the lifting phase, and the section from t1 to t2, which is the section until the leg lands on the ground again after lowering from the highest point, is in the touchdown phase.

Figure 3:
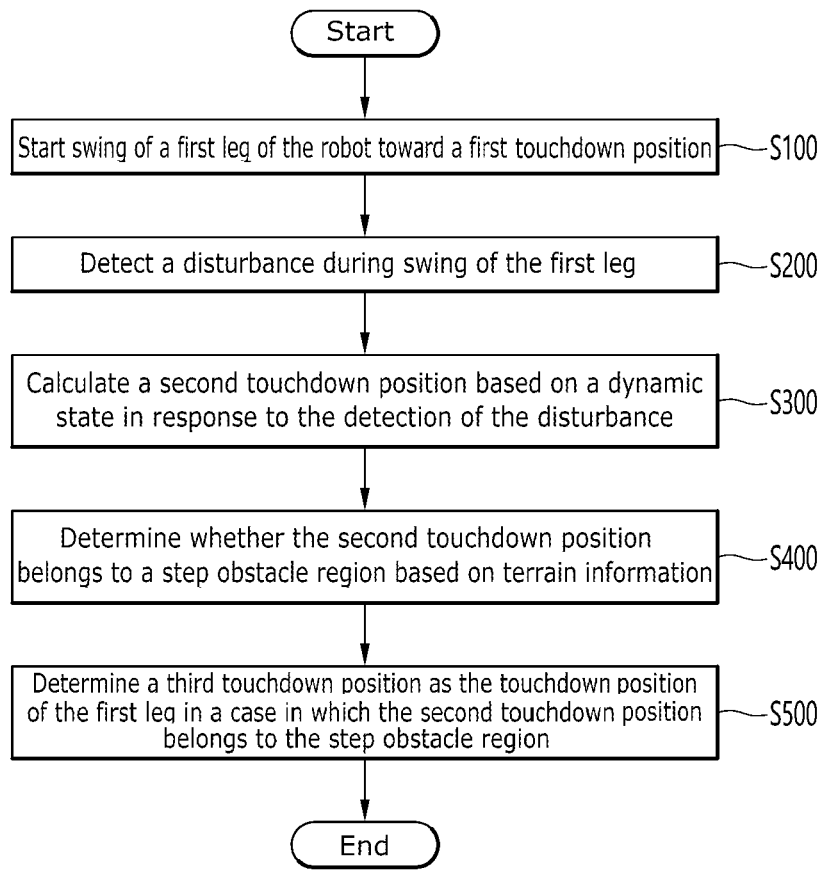
FIG. 3 is a flow chart illustrating a method for determining a touchdown position of the robot according to an embodiment of the present invention.

FIG. 3 is a flow chart illustrating a method for determining a touchdown position of the robot according to an embodiment of the present invention. The method for determining a touchdown position may be performed by the robot 100 of FIG. 1. Therefore, in a case in which a performing subject is not specified, it is assumed that the performing subject is the robot 100.

In step S100, the swing of a first leg of the robot toward a first touchdown position is initiated. Here, the first touchdown position means a preplanned position on the ground as the next position to land the first leg of the robot. In this instance, the first leg may be any one of the legs 120 illustrated in FIG. 1.

Figure 4:
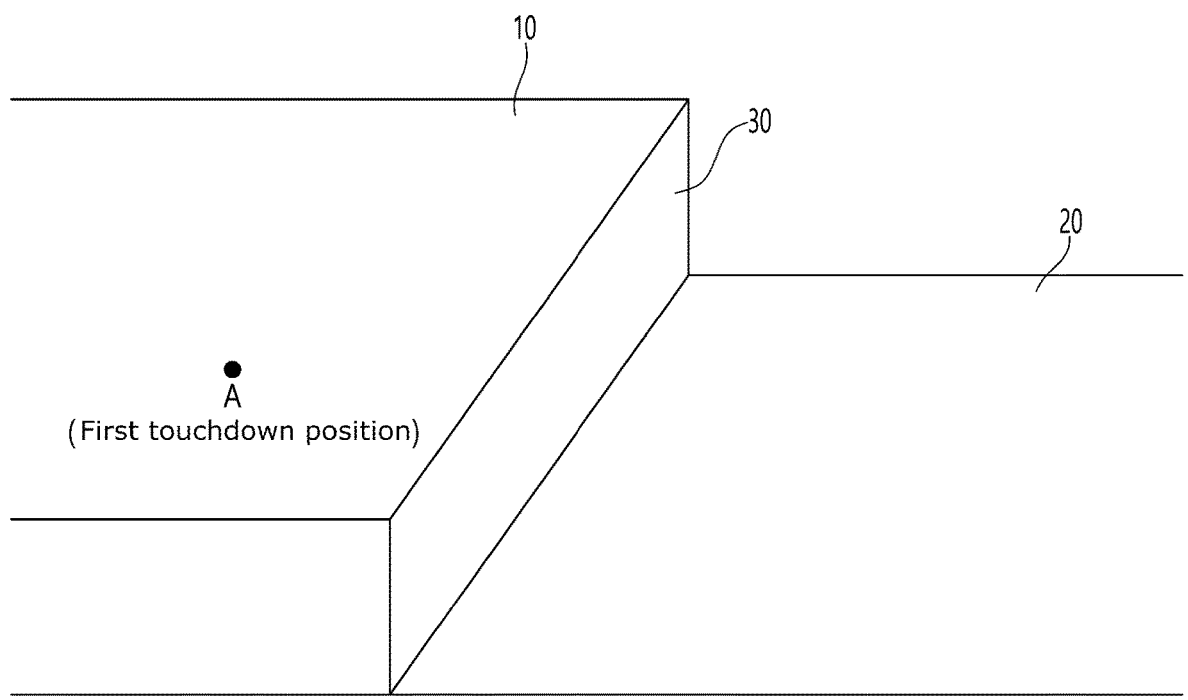
FIGS. 4 to 7 are diagrams for depicting the embodiment of FIG. 3 in detail.

The above will be further described with reference to FIG. 4. In FIG. 4, a terrain including two regions 10 and 20 having different heights is illustrated. An inclined surface 30 may be formed between the first region 10 and the second region 20.

In this instance, it is assumed that the robot walks from the second region 20 to the first region 10. In order to walk, the robot establishes a walking plan in which the robot lifts the first leg placed in the second region 20, moves the first leg along a pre-planned swing trajectory, and then, puts the first leg at a specific position of the first region 10, namely, at a first touchdown position A.

In step S200, a disturbance is detected during the swing of the first leg of the robot toward the first touchdown position.

According to the walking plan, while the robot swings toward the first touchdown position by lifting the first leg, a disturbance may be detected. Here, the disturbance may include an external impact applied to the robot, or an operation error of an internal component of the robot. The disturbance may have an influence on walking of the robot according to types and sizes of the disturbance.

In step S300, a second touchdown position based on a dynamic state of the robot is calculated in response to the detection of the disturbance.

In a case in which the detected disturbance is a slight disturbance that does not affect the walking of the robot, the robot may ignore the detected disturbance and continue walking toward the first touchdown position A as planned.

However, in a case in which the detected disturbance may affect the walking of the robot, it is necessary that the robot re-determines the touchdown position where the first leg will land based on the detected disturbance to maintain a stable posture.

In this instance, the robot calculates a second touchdown position based on its own dynamics as the touchdown position to land the first leg.

In an embodiment, the dynamic state may include a posture, a position, or a state of each joint of the robot, speed or acceleration of each component connected to the joint, the center of gravity of the robot, and the like. Since specific meanings and types of the dynamic state have been widely known in the art, detailed descriptions thereof will be omitted.

Figure 5:
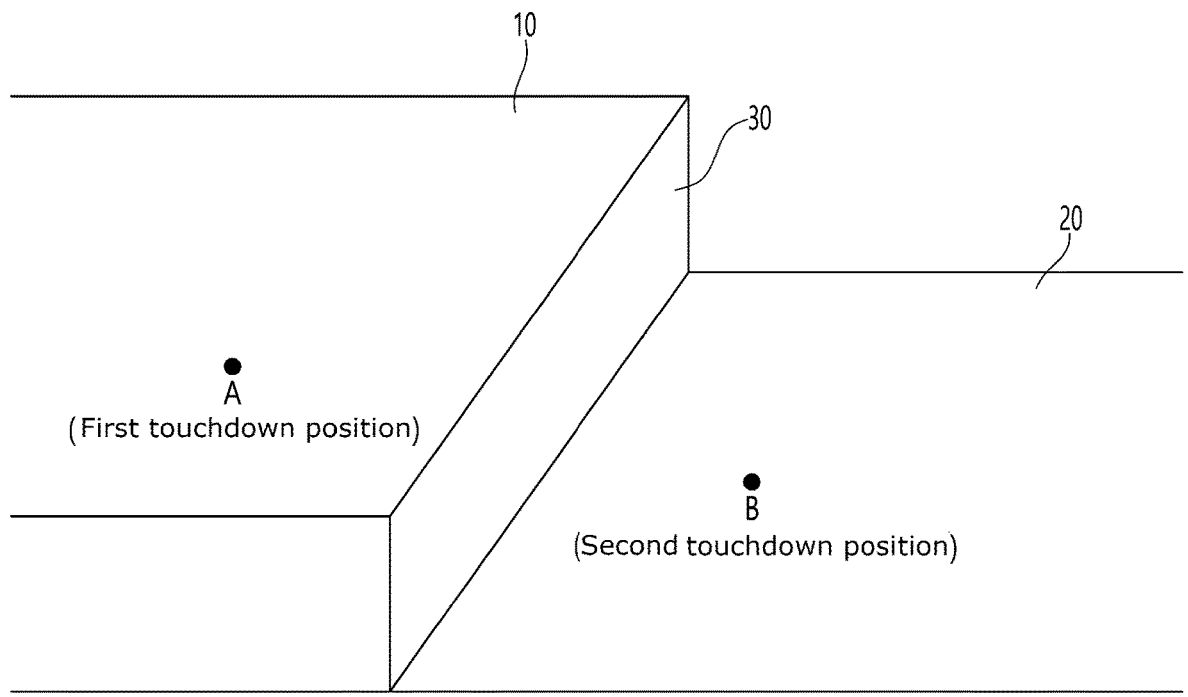

Referring to FIG. 5, the above will be further described. FIG. 5 shows a second touchdown position B as a touchdown position recalculated based on the dynamic state of the robot.

In a case in which a predetermined disturbance is detected while the robot is swinging the first leg toward the first touchdown position A, if the robot continues to move the first leg toward the first touchdown position A, the posture of the robot becomes unstable, and so, the robot falls down or other operational problems may be caused. Therefore, in this case, in order to stably maintain the posture of the robot, the robot calculates the second touchdown position B based on the dynamic state of the robot as a new touchdown position at which the first leg will be landed.

In step S400, the robot identifies a step obstacle region based on terrain information of the robot, and determines whether the second touchdown position belongs to the step obstacle region.

In an embodiment, the terrain information is information collected or identified by using the vision system described in FIG. 1, and may be information indicating geographical features of an environment surrounding the robot 100.

Since the second touchdown position B is calculated based on the dynamic state of the robot for the purpose of stabilizing the robot's posture, the second touchdown position toward the first touchdown position B is within the obstacle region where the robot should not step (for example, a cliff, a manhole, etc.). In this case, if the first leg is placed at the second touchdown position B, since a serious problem may occur, for instance, the robot loses balance and falls down. It must be determined whether or not the second touchdown position B belongs to the step obstacle region.

Figure 6:
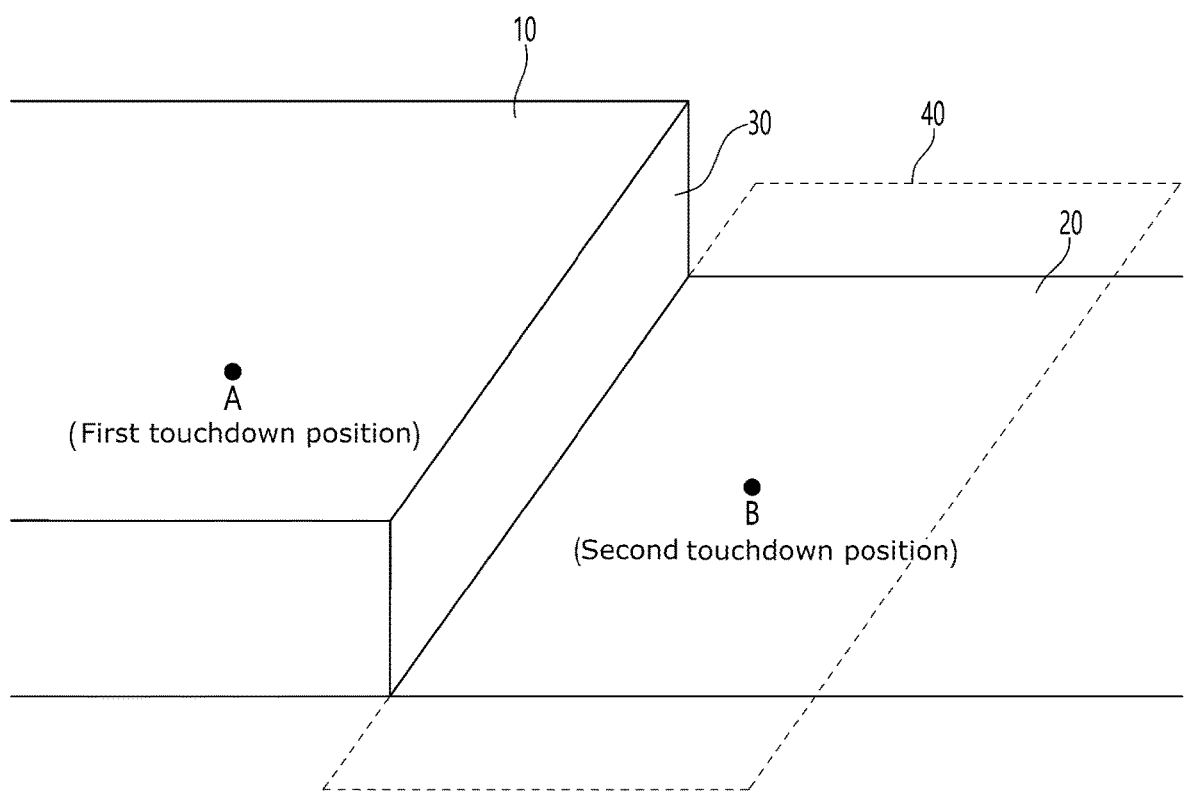

Referring to FIG. 6, further description will be provided. FIG. 6 illustrates the second touchdown position B and a step obstacle region 40 identified based on the terrain information. The step obstacle region 40 is a step avoiding region that the robot should not step. For instance, the step obstacle region 40 may be a region where a height difference from the lifting position of the first leg is a first threshold value or more, and a region where an inclination of the terrain is a second threshold value or more, or a region where a height difference from the first touchdown position A is a third threshold value or more.

In this instance, the lifting position is a position at which the first leg landed on the ground immediately before the swing of the first leg started, and means a position where the lifting of the first leg for the swing of the first leg is started. Meanwhile, specific types and identification conditions of the step obstacle region 40 will be described in more detail below in FIG. 8.

In this embodiment, as illustrated in FIG. 6, it is assumed that the second touchdown position B belongs to the step obstacle region 40.

In step S500, in a case in which the second touchdown position belongs to the step obstacle region, the robot finally determines a third touchdown position out of the step obstacle region as the touchdown position of the first leg.

As described above, when the second touchdown position B is in the step obstacle region 40, in a case in which the robot steps the first leg at the second touchdown position B, the robot may cause a serious problem, for instance, may lose balance and fall down.

Therefore, to avoid the problem, a predetermined position out of the step obstacle region 40 is calculated as the third touchdown position, and the third touchdown position is determined as the final touchdown position where the first leg is to be placed.

Figure 7:
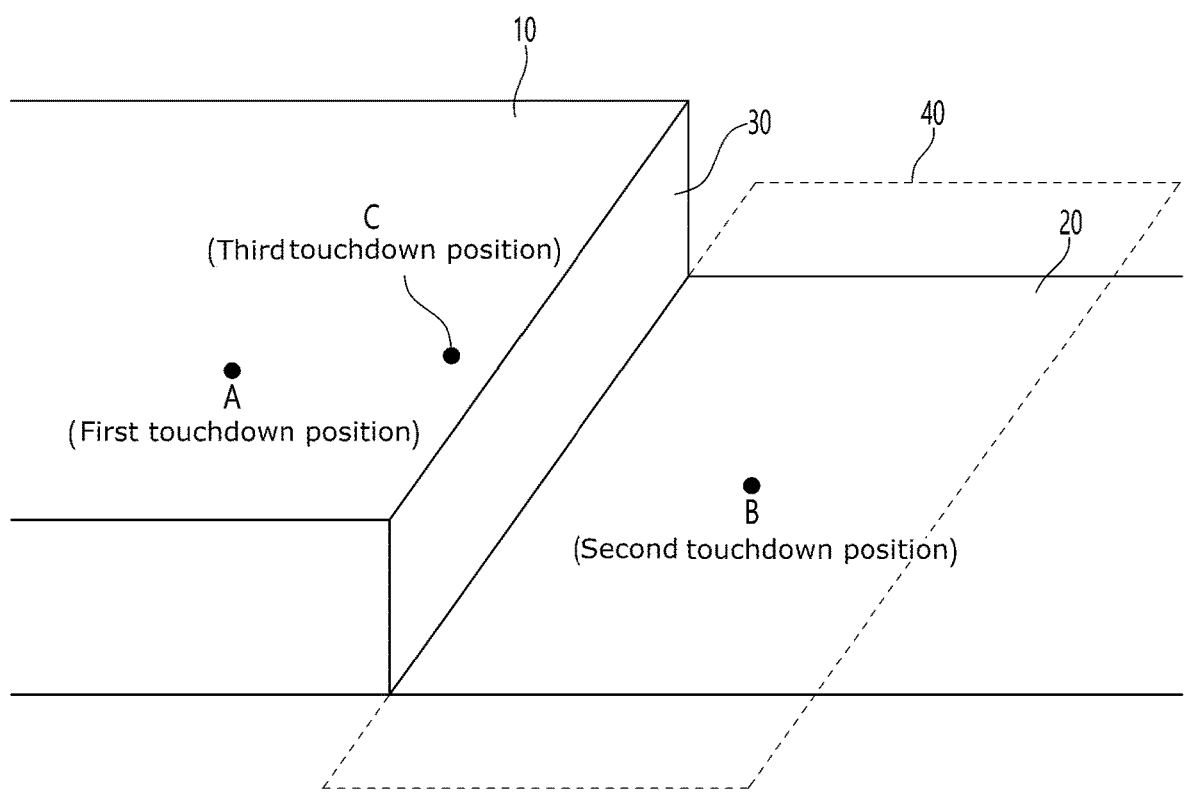

Referring to FIG. 7, the above will be further described. FIG. 7 illustrates an example in which a specific point out of the step obstacle region 40 is calculated as the third touchdown position C in a case in which the second touchdown position B belongs to the step obstacle region 40. In the example of FIG. 7, the first leg of the robot 100 is moved toward the third touchdown position C, and lands at the third touchdown position C.

In an embodiment, the third touchdown position C may be located between the first touchdown position A and the second touchdown position B. A specific calculation method of the third touchdown position C will be described in more detail below with reference to FIG. 14.

Figure 8:
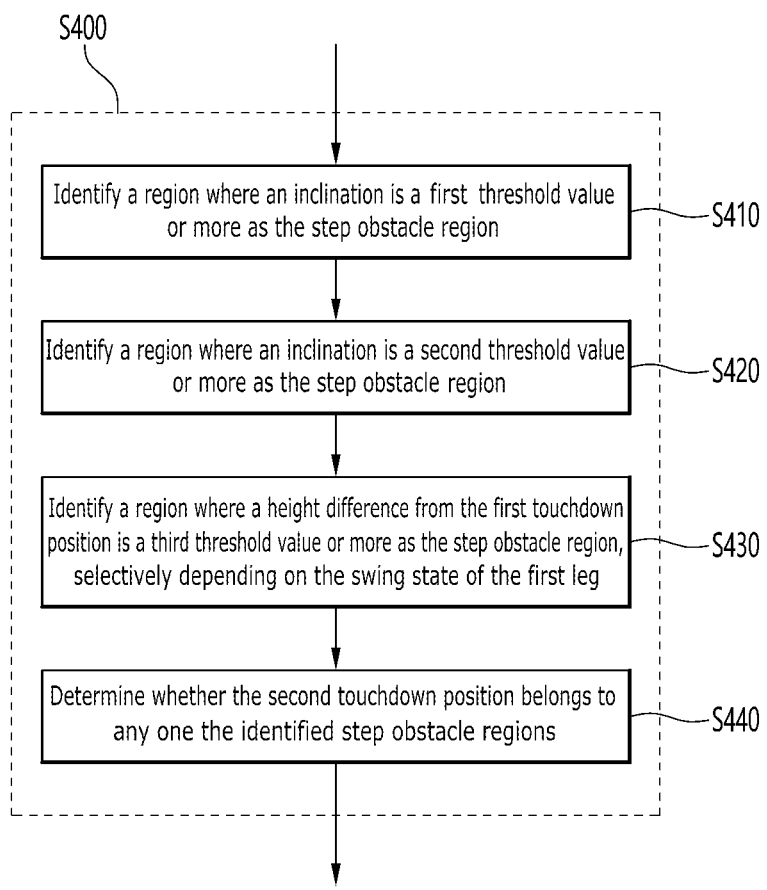
FIG. 8 is a flow chart for depicting the step S400 of FIG. 3 in detail.

FIG. 8 is a flow chart for depicting the step S400 of FIG. 3 in detail. FIG. 8 illustrates a specific method for identifying the step obstacle region. In the embodiment of FIG. 8, it is described that steps S410 to S440 are performed sequentially, but the scope of the present invention is not limited thereto. For example, the order of performing steps S410, S420, and S430 may be switched, and some of steps S410, S420, and S430 may be omitted. Hereinafter, the method will be described referring to the drawings.

In step S410, a region where a height difference from the lifting position of the first leg is a first threshold value or more is identified as the step obstacle region.

As described above, the lifting position is a position at which the first leg landed on the ground immediately before the swing of the first leg started, and means a position where the lifting of the first leg for the swing of the first leg is started.

In general, if a height difference between the lifting position of the first leg and the touchdown position of the first leg is too large, the posture of the robot is likely to collapse due to instability due to a restriction in the swing width of the first leg or excessive swing of the first leg. Therefore, when the robot walks, it is preferable not to step on the region where height difference between the lifting position of the first leg and the touchdown position of the first leg is too large.

Meanwhile, the region where a height difference from the lifting position of the first leg is the first threshold value or more includes a region where the height of the first threshold value or more is higher than the lifting position or a region where the height of the first threshold value or more is lower than the lifting position.

It will be further described with reference to FIG. 9.

Figure 9:
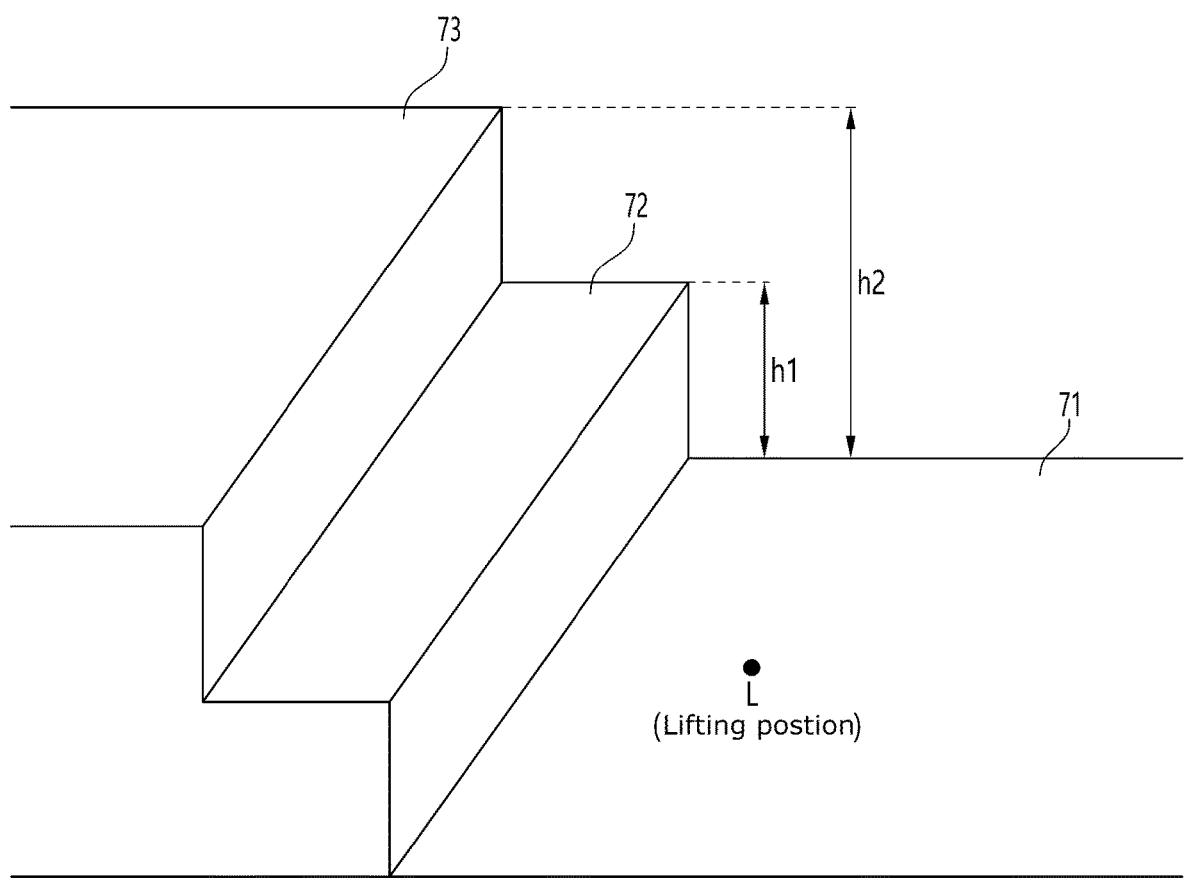
FIGS. 9 to 13 are diagrams illustrating the embodiment of FIG. 8 in detail.

Referring to FIG. 9, a plurality of regions 71, 72 and 73 having different heights are illustrated. The third region 73 is a position where the first leg landed before the first leg starts swing, and includes a lifting position L of the first leg. The fourth region 72 is a position having a height h1 which is higher than the third region 71, and the fifth region 73 is a position having a height h2 which is higher than the third region 71.

In this instance, if the first threshold value which is the base to determine the step obstacle region is smaller than h1, the fourth region 72 and the fifth region 73 are all identified as the step obstacle regions.

In another embodiment, if the first threshold value which is the base to determine the step obstacle region is larger than h1 but is smaller than h2, the fourth region 72 is not identified as the step obstacle region but the fifth region 73 is identified as the step obstacle region.

In another embodiment, if the first threshold value which is the base to determine the step obstacle region is larger than h2, all of the fourth region 72 and the fifth region 73 are not identified as the step obstacle regions.

Meanwhile, FIG. 9 illustrates that the region where the height of the first threshold value or more is higher than the lifting position is identified as the step obstacle region, but in the same manner, also a region where the height of the first threshold value or more is lower than the lifting position may be also identified as the step obstacle region. It will be further described with reference to FIG. 10.

Figure 10:
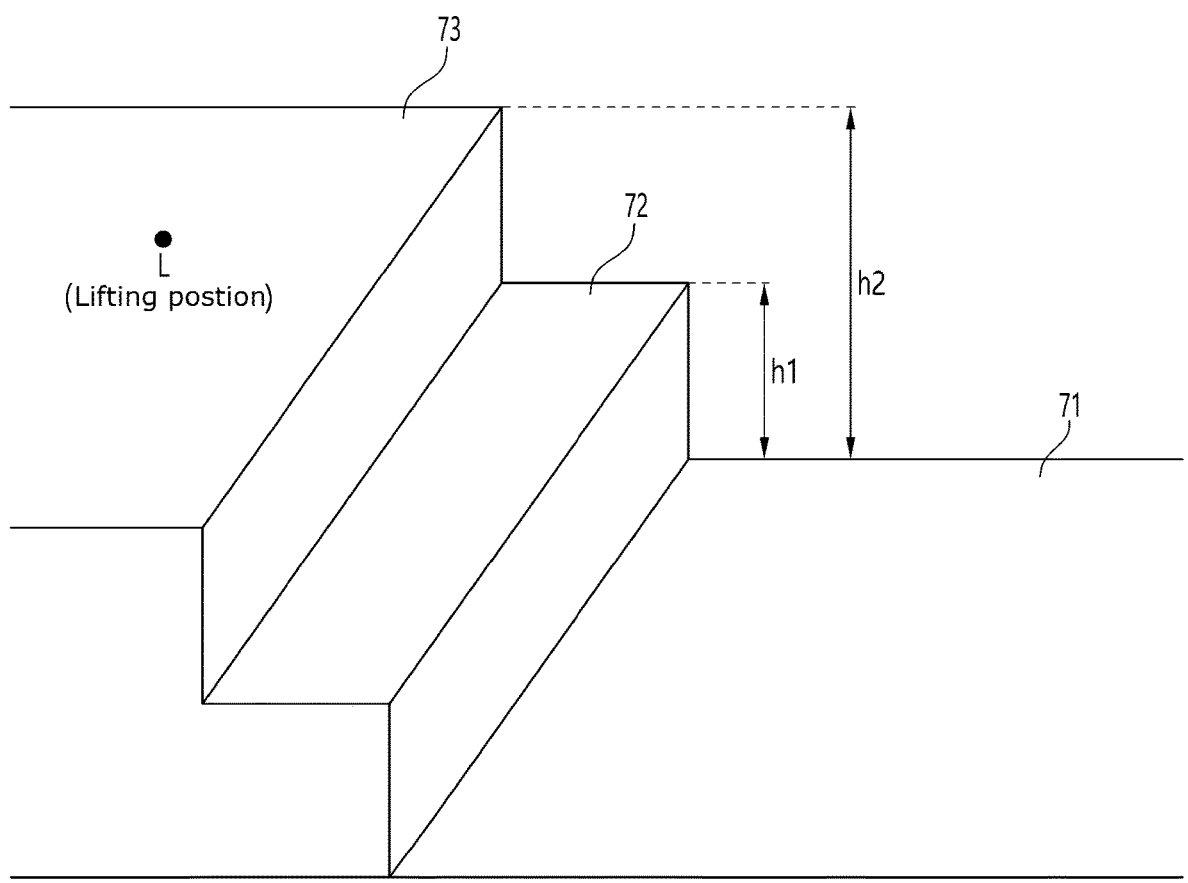
Figure 11:
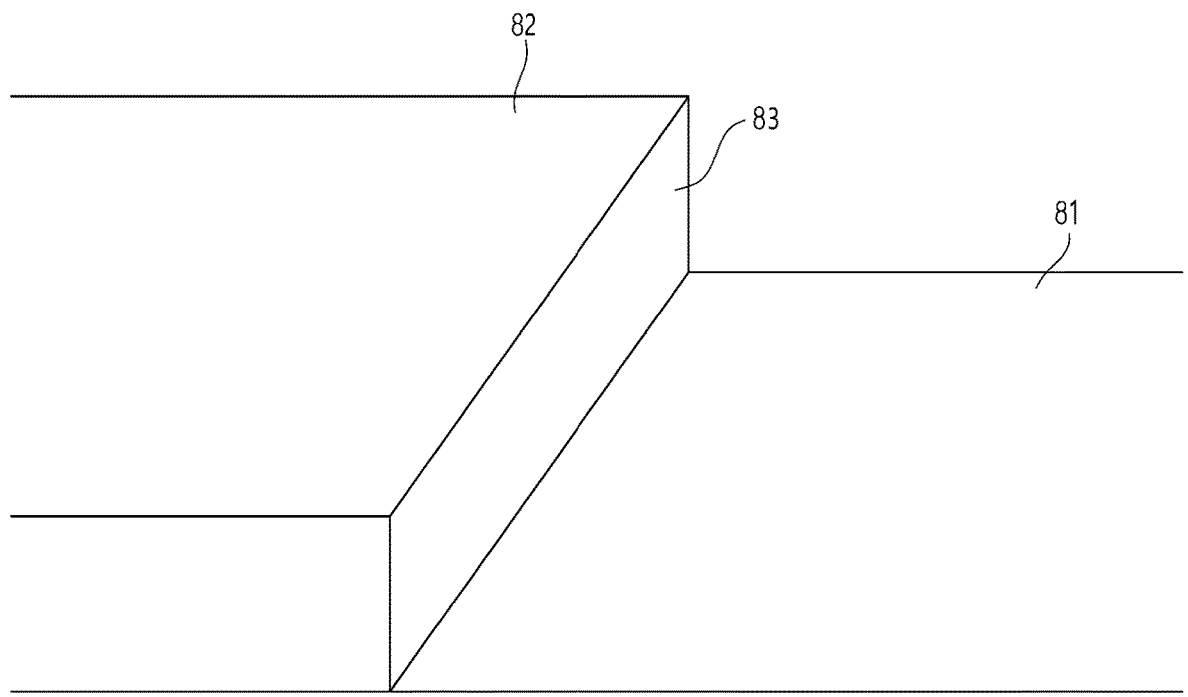

In FIG. 10, it is assumed that the lifting position L is included in the fifth region 73.

In this instance, if the first threshold value which is the base to determine the step obstacle region is smaller than h2-h1, the third region 71 and the fourth region 72 are all identified as the step obstacle regions.

In another embodiment, if the first threshold value which is the base to determine the step obstacle region is larger than h2-h1 but is smaller than h2, the fourth region 72 is not identified as the step obstacle region but the third region 73 is identified as the step obstacle region.

In another embodiment, if the first threshold value which is the base to determine the step obstacle region is larger than h2, all of the third region 71 and the fourth region 72 are not identified as the step obstacle regions.

In step S420, a region where the inclination is the second threshold value or more is identified as the step obstacle region.

If the first leg steps on a region where the inclination is too steep, the first leg may not sufficiently support the load of the robot, or may slip in a stance state due to the large inclination. Therefore, when the robot walks, it is preferable not to step on the region with an excessively large inclination.

Further description will be provided with reference to FIG. 10.

Referring to FIG. 10, a plurality of regions 81 and 82 having different heights are illustrated. A sixth region 83 having an inclination which is almost vertical is formed between the two regions 81 and 82.

In this instance, when the first leg of the robot steps on the sixth region 83 having an inclination greater than the second threshold value (e.g., 40 degrees), the first leg cannot sufficiently support a load of the robot, or cannot stably support the robot since the first leg may slip in the stance state due to the large inclination of the ground.

Accordingly, the region 83 having the inclination greater than the second threshold is identified as the step obstacle region.

In step S430, selectively depending on the swing state of the first leg, the region where a height difference from the first touchdown position is the third threshold value or more is identified as the step obstacle region.

Here, to selectively identify a specific region as the step obstacle region depending on the swing state of the first leg means that the specific region may be identified as the step obstacle region or not according to whether the current swing state of the first leg is the lifting phase or the touchdown phase. It will be described with reference to FIG. 12.

Figure 12:
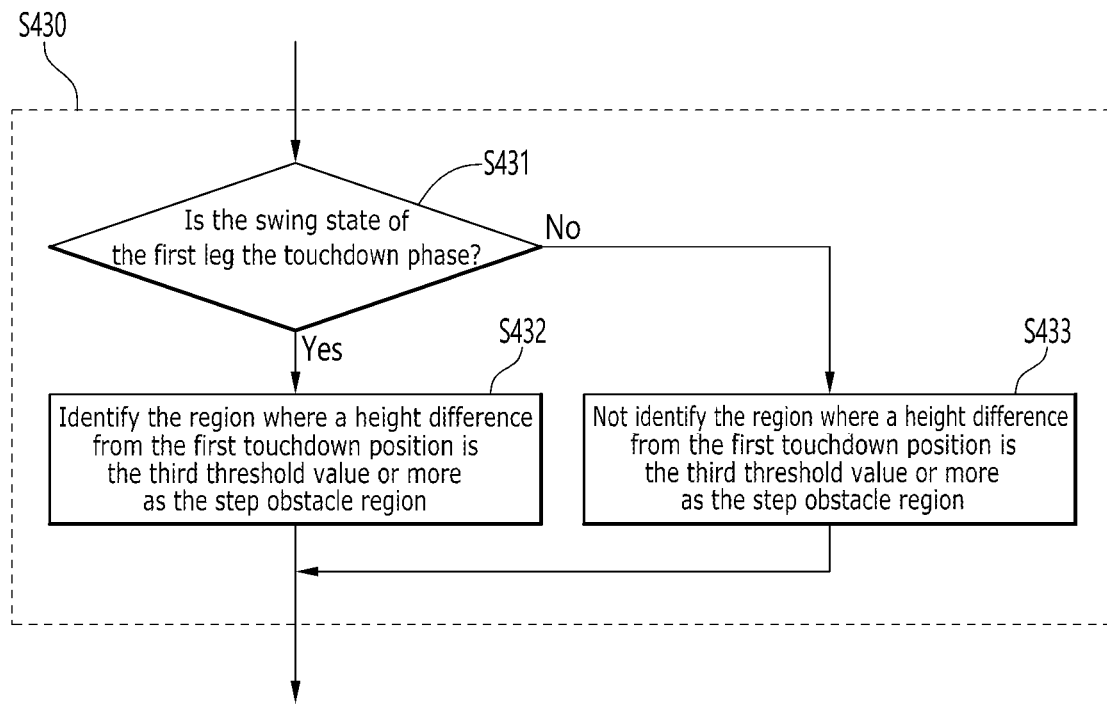

FIG. 12 is a flow chart for depicting the step S430 of FIG. 8 in more detail.

First, in step S431, the current swing state of the first leg is identified. If the swing state of the first leg is the touchdown phase, this embodiment proceeds to step S432 to identify the region where a height difference from the first touchdown position is the third threshold value or more as the step obstacle region. If the swing state of the first leg is not the touchdown phase (namely, if the swing state of the first leg is the lifting phase), this embodiment proceeds to step S433. Then, the region where a height difference from the first touchdown position is the third threshold value or more is not identified as the step obstacle region.

As described above, the region where a height difference from the first touchdown position is the third threshold value or more is selectively identified as the step obstacle region since the posture stability of the robot may be varied when the robot steps on the region where a height difference from the first touchdown position is the third threshold value or more according to the swing state of the first leg.

For instance, in a case in which the first leg of the robot is still in the lifting phase, even though the touchdown position of the first leg is changed, it is possible to adaptively correct the operation of the first leg according to the changed touchdown position. However, in a case in which the first leg of the robot is in the touchdown phase, since the first leg is already descending toward the original touchdown position, the changeable range of the touchdown position is limited. In particular, in a case in which the difference in height between the original touchdown position and the changed touchdown position is greater than a certain level, the posture of the robot is highly likely to be greatly unstable when the first leg steps on the changed touchdown position.

Therefore, after the swing state of the first leg is first identified, and in a case in which the swing state of the first leg is the touchdown phase, the region where the height difference from the original touchdown position (e.g., the first touchdown position) is the third threshold value or more may be identified as the step obstacle region. It will be further described with reference to FIG. 13.

Figure 13:
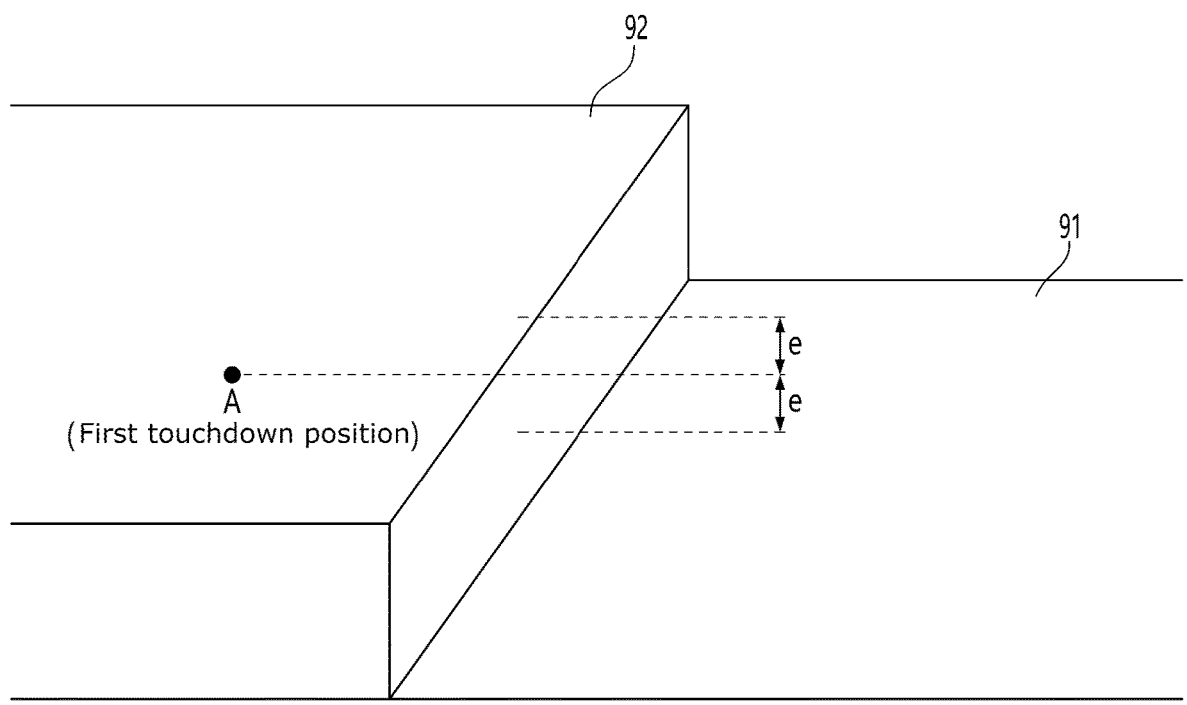

FIG. 13 illustrates a plurality of regions 91 and 92 having different heights. The first touchdown position A which is the original touchdown position is included in the seventh region 92. When the second touchdown position B is calculated by detecting a disturbance during the operation of the first leg, it is determined that the second touchdown position B belongs to the step obstacle region.

In this instance, the step obstacle region may be identified based on the height difference from the first touchdown position A. For instance, the region 91 where the height difference from the first touchdown position A is a third threshold value e or more is selectively identified as the step obstacle region according to the swing state of the first leg. If the swing state of the first leg is the lifting phase, since it is relatively easy to adaptively correct the operation of the first leg according to the changed touchdown position, also the region 91 where the height difference from the first touchdown position A is the third threshold value e or more is not identified as the step obstacle region. On the contrary, if the swing state of the first leg is the touchdown phase, since the first leg is already descending toward the original touchdown position, there is high probability that the posture of the robot becomes greatly unstable when the first leg steps on the region 91 where the height difference from the first touchdown position A is the third threshold value e or more. Therefore, in a case in which the swing state of the first leg is the touchdown phase, the region 91 91 where the height difference from the first touchdown position A is the third threshold value e or more is identified as the step obstacle region.

Figure 14:
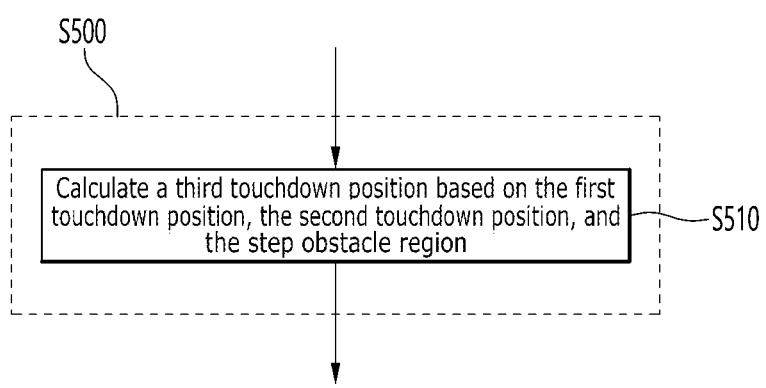
FIG. 14 is a flow chart illustrating the step S500 of FIG. 3 in detail.

FIG. 14 is a flow chart for depicting the step S500 of FIG. 3 in more detail. FIG. 14 illustrates an example of a method of calculating a third touchdown position outside the step obstacle region when the second touchdown position belongs to the step obstacle region.

In step S510, a third touchdown position is calculated based on the first touchdown position, the second touchdown position, and the step obstacle region. It will be described with reference to FIGS. 15 to 18 in detail.

Figure 15:
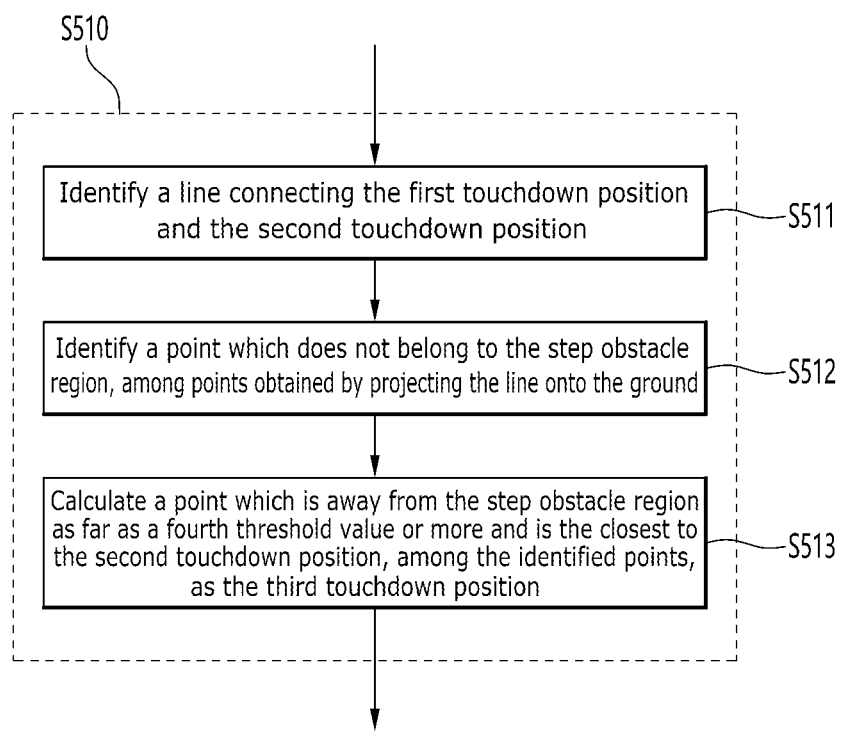
FIG. 15 is a flow chart illustrating the step S510 of FIG. 3 in detail.

FIG. 15 is a flow chart for depicting the step S510 of FIG. 14 in more detail.

First, in step S511, a line connecting the first touchdown position A and the second touchdown position B is identified.

In step S512, points on the ground corresponding to the identified line, for example, points that do not belong to the step obstacle region, are identified among points where the line is projected onto the ground.

In step S513, a point which is away from the step obstacle region as far as a fourth threshold value or more and is the closest to the second touchdown position, among the identified points, is calculated as a third touchdown position.

This embodiment will be further described with reference to FIGS. 16 to 18.

Figure 16:
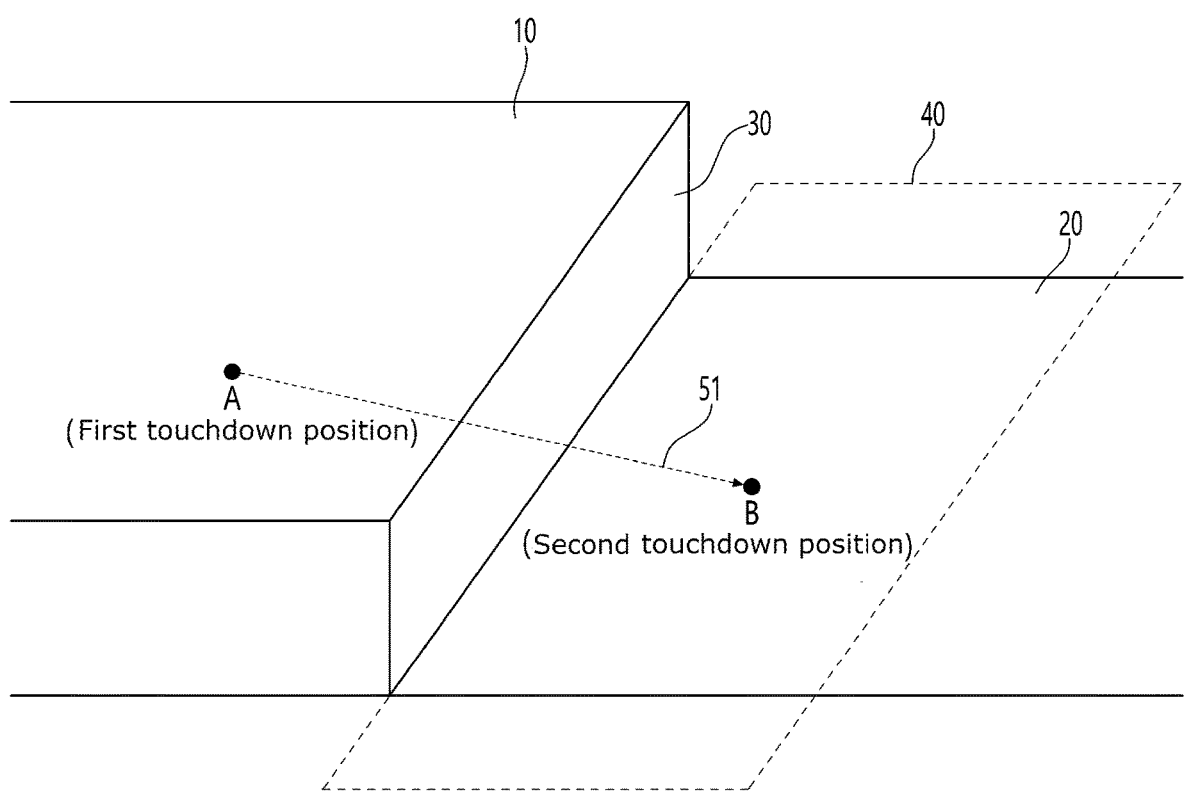
FIGS. 16 to 18 are diagrams for depicting the embodiment of FIG. 15 in detail.

FIG. 16 illustrates a terrain in which a first region 10, a second region 20, an inclination 30, and a step obstacle region 40. The first touchdown position A, which is the original touchdown position of the first leg, is included in the first region 10. A disturbance is detected during the swing of the first leg, and the second touchdown position B calculated based on the dynamics of the robot is included in the second region 20. In this instance, it is assumed that the second touchdown position B is included in the identified step obstacle region 40.

In this case, since it is undesirable to land the first leg at the second touchdown position B, the third touchdown position should be determined among points out of the step obstacle region 40.

Accordingly, first, a line 51 connecting the first touchdown position A and the second touchdown position B is identified. The line 51 may preferably be a straight line.

However, since both the first touchdown position A and the second touchdown position B are points on the ground, it is not desirable to directly determine a specific point on the line 51 as the third touchdown position because the specific point on the line 51 may be a point below the ground or a point floating in the air.

Figure 17:
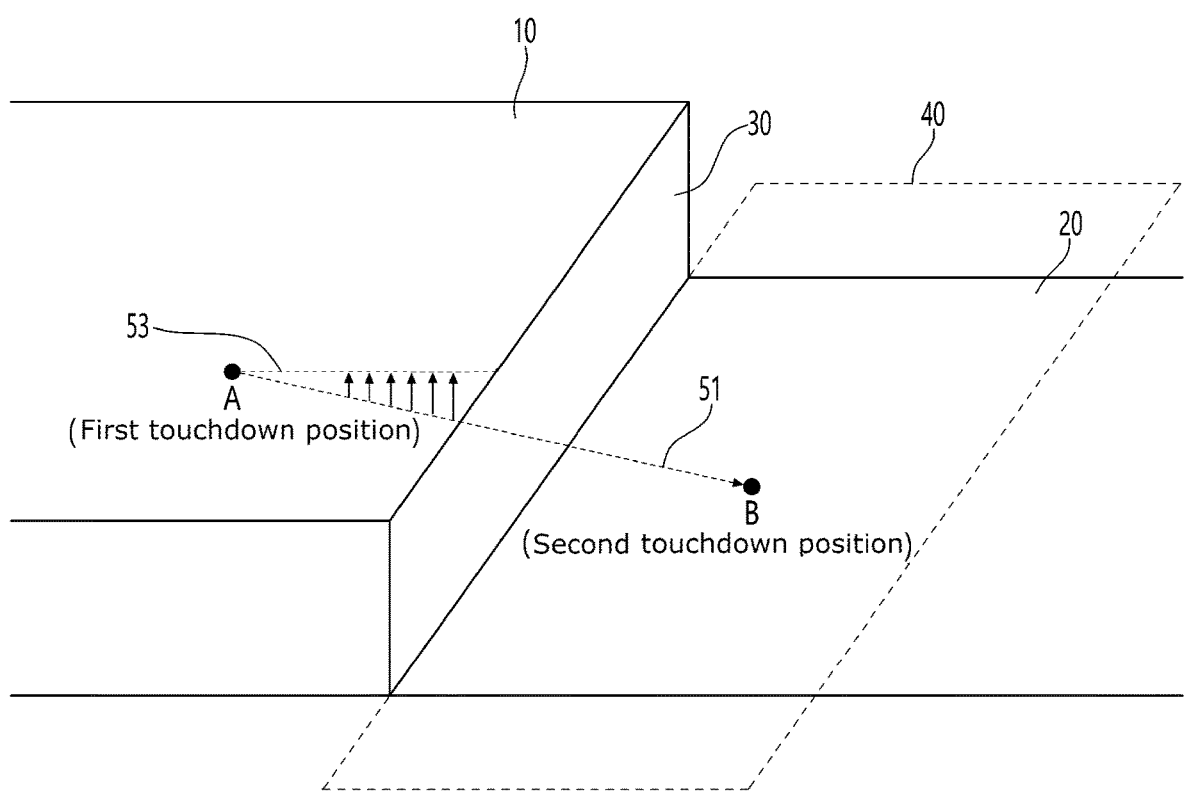

Referring to FIG. 17, a projected line 52 obtained by projecting the line 51 onto the ground is identified, and candidate points that do not belong to the step obstacle region 40, among points on the projected line 52, are identified. Since all of the candidate points are points on the ground and do not belong to the step obstacle region 40, they can be candidates for the third touchdown position.

Figure 18:
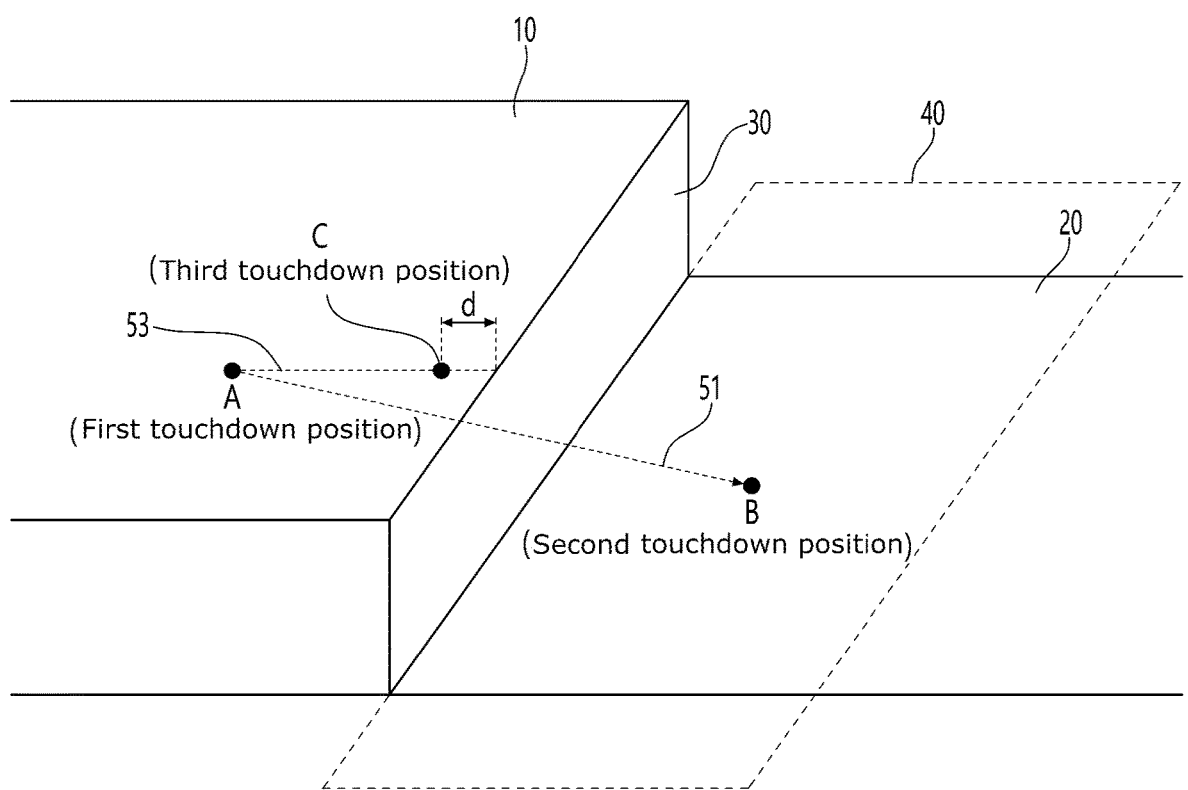

Finally, referring to FIG. 18, a point which is away from the step obstacle region as far as a fourth threshold value d or more and is the closest to the second touchdown position B, among the candidate points, is calculated as a third touchdown position C.

Since the touchdown position calculated based on the dynamic state of the robot is the second touchdown position B, considering the dynamic state of the robot, it is preferable to calculate the point closest to the second touchdown position B among the candidate points as the third touchdown position. However, since a portion of the foot of the robot may unintentionally step on the step obstacle region 40 if the third touchdown position C is too close to a boundary of the step obstacle region 40, it is preferable that the third touchdown position C is spaced apart from the step obstacle region 40 at a predetermined interval.

Therefore, the point which is away from the step obstacle region as far as a fourth threshold value d or more and is the closest to the second touchdown position B, among the candidate points, is calculated and determined as the third touchdown position C.

According to embodiments of the present invention described above, provided are the robot which can walk and move while landing legs at an appropriate position on the ground in irregular geographical features, and the method for determining a touchdown position of the robot. In addition, the robot can stably maintain its posture by landing the legs at an appropriate position even when a disturbance is applied during swinging of the legs.

Hereinafter, an exemplary computing device 500 that can implement an apparatus and a system, according to various embodiments of the present invention, will be described with reference to FIG. 19. For example, the computing device 500 may be the robot 100 depicted in FIG. 1.

Figure 19:
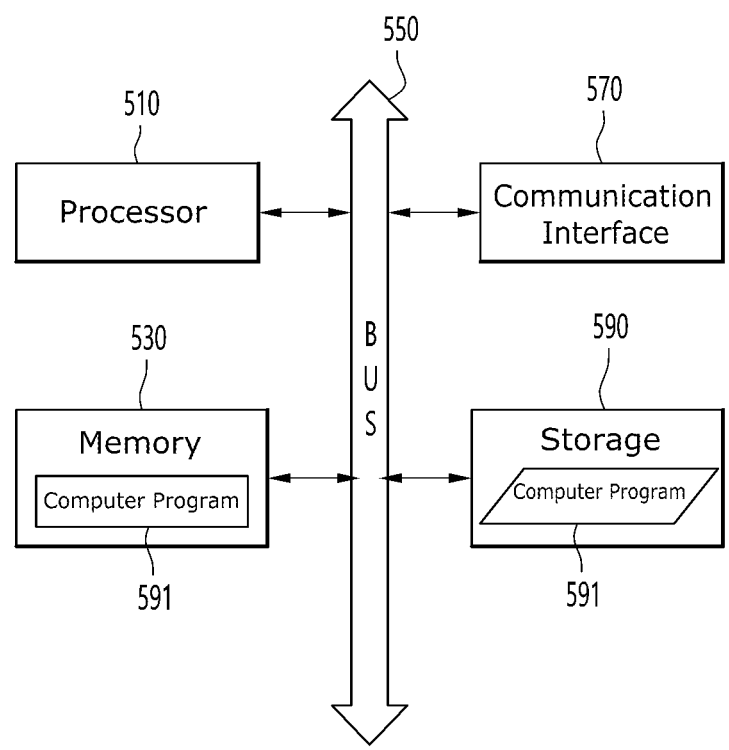
FIG. 19 is a block diagram illustrating a hardware configuration of a computing device implementing various embodiments of the present invention.

FIG. 19 is an example hardware diagram illustrating a computing device 500.

As shown in FIG. 19, the computing device 500 may include one or more processors 510, a bus 550, a communication interface 570, a memory 530, which loads a computer program 591 executed by the processors 510, and a storage 590 for storing the computer program 591. However, FIG. 19 illustrates only the components related to the embodiment of the present invention. Therefore, it will be appreciated by those skilled in the art that the present invention may further include other general purpose components in addition to the components shown in FIG. 19.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present invention. The computing device 500 may have one or more processors.

The memory 530 stores various data, instructions and/or information. The memory 530 may load one or more programs 591 from the storage 590 to execute methods/operations according to various embodiments of the present invention. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present invention.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present invention are implemented. For example, the computer program 591 may comprise instructions for executing an operation of detecting a disturbance during swing of a first leg of the robot toward a first touchdown position, an operation of calculating a second touchdown position based on a dynamic state of the robot in response to the detection of the disturbance, an operation of identifying a step obstacle region based on terrain information of the robot and determining whether the second touchdown position belongs to the step obstacle region, and an operation of determining a third touchdown position out of the step obstacle region as the touchdown position of the first leg, in a case in which the second touchdown position belongs to the step obstacle region.

When the computer program 591 is loaded on the memory 530, the processor 510 may perform the methods/operations in accordance with various embodiments of the present invention by executing the one or more instructions.

The technical features of the present invention described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present invention.

What is claimed is:

1. A method for determining a touchdown position of a robot performed by a computing device, the method comprising the steps of:
   detecting a disturbance during a swing state of a first leg of the robot toward a first touchdown position;
   calculating a second touchdown position based on a dynamic state of the robot in response to the detection of the disturbance;
   identifying a step obstacle region based on terrain information and the swing state of the first leg when the disturbance is detected, and determining whether the second touchdown position belongs to the step obstacle region;
   determining a third touchdown position outside the step obstacle region as the touchdown position of the first leg, in a case in which the second touchdown position belongs to the step obstacle region; and
   controlling the first leg of the robot to be landed at the third touchdown position,
   wherein, if the swing state of the first leg when the disturbance is detected is a touchdown phase, the region where a height difference from the first touchdown position is a third threshold value or more is identified as the step obstacle region, and
   if the swing state of the first leg when the disturbance is detected is a lifting phase, the region where the height difference from the first touchdown position is the third threshold value or more is not identified as the step obstacle region.

2. The method according to claim 1, wherein the step obstacle region includes a region where a height difference from the lifting position of the first leg is a first threshold value or more.

3. The method according to claim 1, wherein the step obstacle region includes a region where an inclination is a second threshold value or more.

4. The method according to claim 1, wherein the third touchdown position is determined based on the first touchdown position, the second touchdown position, and the step obstacle region.

5. The method according to claim 4, wherein the third touchdown position is determined using points identified as not belonging to the step obstacle region, among points that a line connecting the first touchdown position and the second touchdown position is projected onto the ground.

6. The method according to claim 5, wherein the third touchdown position is determined to be a point which is away from the step obstacle region as far as a fourth threshold value or more and is the closest to the second touchdown position, among the identified points, as the third touchdown position.

7. A robot having a plurality of legs comprising:
   a processor;
   a memory loading a computer program executed by the processor; and
   a storage storing the computer program,
   wherein the computer program comprises instructions for executing:
   an operation of detecting a disturbance during a swing state of a first leg of the robot toward a first touchdown position;
   an operation of calculating a second touchdown position based on a dynamic state of the robot in response to the detection of the disturbance;
   an operation of identifying a step obstacle region based on terrain information of the robot, the swing state of the first leg when the disturbance is detected, and determining whether the second touchdown position belongs to the step obstacle region;
   an operation of determining a third touchdown position outside the step obstacle region as the touchdown position of the first leg, in a case in which the second touchdown position belongs to the step obstacle region; and
   an operation of controlling the first leg of the robot to be landed at the third touchdown position,
   wherein, if the swing state of the first leg when the disturbance is detected is a touchdown phase, the region where a height difference from the first touchdown position is a third threshold value or more is identified as the step obstacle region, and if the swing state of the first leg when the disturbance is detected is a lifting phase, the region where the height difference from the first touchdown position is the third threshold value or more is not identified as the step obstacle region.

* * * * *